United States Patent
Uhlianuk et al.

(10) Patent No.: US 9,856,384 B2
(45) Date of Patent: Jan. 2, 2018

(54) SAG CONTROL COMPOSITIONS, METHODS OF FORMING THE SAME, AND METHODS OF FORMING COATING SYSTEMS USING THE SAME

(71) Applicant: AXALTA COATING SYSTEMS IP CO., LLC, Wilmington, DE (US)

(72) Inventors: Peter W. Uhlianuk, Romeo, MI (US); Delson J. Trindade, Rochester Hills, MI (US); Brian J. Ladd, Ortonville, MI (US)

(73) Assignee: AXALTA COATINGS SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 14/336,222

(22) Filed: Jul. 21, 2014

(65) Prior Publication Data
US 2016/0017158 A1    Jan. 21, 2016

(51) Int. Cl.
| | |
|---|---|
| C09D 7/02 | (2006.01) |
| C09D 7/12 | (2006.01) |
| C09D 5/00 | (2006.01) |
| C08G 18/73 | (2006.01) |
| C08G 18/28 | (2006.01) |
| C08K 5/21 | (2006.01) |

(52) U.S. Cl.
CPC ........ C09D 7/125 (2013.01); C08G 18/2865 (2013.01); C08G 18/73 (2013.01); C09D 5/00 (2013.01); C09D 7/1283 (2013.01); C08K 5/21 (2013.01)

(58) Field of Classification Search
CPC ........ C09D 7/125; C09D 7/1283; C09D 5/00; C08K 5/21
See application file for complete search history.

(56) References Cited

U.S. PATENT DOCUMENTS

| | | | | |
|---|---|---|---|---|
| 4,311,622 A | * | 1/1982 | Buter | C09D 5/04 106/218 |
| 4,383,068 A | * | 5/1983 | Brandt | C08G 18/2805 524/196 |
| 4,851,294 A | * | 7/1989 | Buter | C08G 18/2865 427/386 |
| 6,649,706 B1 | * | 11/2003 | Heid | C09D 5/04 524/196 |

(Continued)

FOREIGN PATENT DOCUMENTS

WO    WO2014012769    *    1/2014 ............ C08G 18/08

OTHER PUBLICATIONS

DPMA, German Examination Report issued in Application No. 10 2015 213 488.1, dated Aug. 1, 2016.

*Primary Examiner* — Michael L Leonard
(74) *Attorney, Agent, or Firm* — Lorenz & Kopf LLP (57) ABSTRACT

Sag control compositions, methods of forming sag control compositions, and methods of forming coating systems that include at least one coating layer including urea crystals of such sag control compositions are provided herein. In an embodiment, a sag control composition includes urea crystals and a non-polymeric organic solvent. The urea crystals include the reaction product of a polyisocyanate and a mono-amine. The sag control composition is a stable mixture with a single phase at a temperature of about 21° C. based upon visual observation for a period of at least 10 minutes after forming the mixture.

19 Claims, 3 Drawing Sheets

(56) References Cited

U.S. PATENT DOCUMENTS

| | | | |
|---|---|---|---|
| 8,148,460 B2 | 4/2012 | Alpert et al. | |
| 2005/0131134 A1* | 6/2005 | Green | C08G 18/2865 524/589 |
| 2008/0132639 A1* | 6/2008 | Huybrechts | C08G 18/0828 524/608 |
| 2008/0139755 A1* | 6/2008 | Brinkhuis | C08G 18/28 525/452 |
| 2008/0146720 A1* | 6/2008 | Brinkhuis | C08G 18/2865 524/445 |
| 2013/0303804 A1* | 11/2013 | Walther | C08G 18/2865 564/63 |
| 2014/0357766 A1* | 12/2014 | December | C09D 133/08 524/38 |
| 2015/0291757 A1* | 10/2015 | Woutters | C08G 18/7671 521/99 |

* cited by examiner

SAG CONTROL COMPOSITIONS, METHODS OF FORMING THE SAME, AND METHODS OF FORMING COATING SYSTEMS USING THE SAME

TECHNICAL FIELD

The technical field generally relates to sag control compositions, methods of forming the same, and methods of forming coating systems using the same. More particularly, the technical field relates to sag control compositions that include urea crystals and a non-polymeric organic solvent, methods of forming the same, and methods of forming coating systems using the same.

BACKGROUND

A typical coating system disposed over a substrate includes some or all of the following layers: (1) one or more primer layers that provide adhesion and basic protection, and also cover minor surface unevenness of the substrate; (2) one or more basecoat layers, typically pigmented, that provide durability and color; and (3) one or more clearcoat layers that provide additional durability and improved appearance. A colored topcoat layer can be used in place of the basecoat layer and clearcoat layer.

In some industrial applications, such as coating metal pipes, trucks, and other industrial equipment, it is often desired to complete the coating process in a short period of time while still achieving good adhesion, protection, durability and appearance. Conventional coating compositions typically produce a thin dried and cured coating layer that may not have sufficient thickness to cover unevenness of the substrate if only a single layer is used. Coating unevenness could result in undesired appearance. When conventional coatings are applied at a high coating thickness, surface coating defects such as microfoaming and low gloss may occur. In addition, thick coating layers can be prone to sagging defects, especially for coating layers applied on vertical surfaces.

Because of the known sagging problems when applying coating compositions, sag control compositions are often added to form a smooth sag-free surface. Typical sag control compositions are produced by reacting an amine-containing compound with an isocyanate-containing compound in the presence of a coating resin such as, for example, an acrylic resin. The resulting sag control compositions include urea particles that contain the reaction product of the amine-containing compound and the isocyanate-containing compound as well as the coating resin.

However, such sag control compositions present a number of challenges. Conventional sag control compositions are specific to the particular coating compositions that include the coating resins used to form the sag control compositions, and facilities that employ coating compositions with different coating resins must generally employ sag control compositions that are specific to each different coating composition. Further, such sag control compositions also generally require special offsite compounding by external suppliers to form the sag control compositions, thereby increasing cost and production inefficiency.

In addition, some sag control compositions are prepared by reacting an amine-containing compound with an isocyanate-containing compound in the presence of various solvents. However, due to viscosity considerations and the impact of high viscosity on ease of use, the sag control compositions are generally prepared at low concentrations of less than about 4 weight % of the urea particles based on the total weight of the sag control compositions. Such sag control compositions exhibit poor stability, with the urea particles quickly separating out of solution, and are therefore not employed in conventional coating systems.

Accordingly, it is desirable to provide sag control compositions that can be employed in various coating compositions that contain different coating resins and that exhibit excellent stability. In addition, it is desirable to provide methods of forming such sag control compositions. In addition, it is desirable to provide methods of forming coating systems that include at least one coating layer including urea crystals of such sag control compositions. Furthermore, other desirable features and characteristics of the present invention will become apparent from the subsequent detailed description and the appended claims, taken in conjunction with the accompanying drawings and this background.

BRIEF SUMMARY

Sag control compositions, methods of forming sag control compositions, and methods of forming coating systems that include at least one coating layer including urea crystals of such sag control compositions are provided herein. In an embodiment, a sag control composition includes urea crystals and a non-polymeric organic solvent. The urea crystals include the reaction product of a polyisocyanate and a mono-amine. The sag control composition is a stable mixture with a single phase at a temperature of about 21° C. based upon visual observation for a period of at least 10 minutes after forming the mixture.

In another embodiment, a method of forming a sag control composition includes combining a mono-amine and a non-polymeric organic solvent to form a sag control pre-mix. Shear force is applied to the sag control pre-mix in a mixing device chosen from an emulsifier device or a disperser. While applying the shear force to the sag control pre-mix in the mixing device, a polyisocyanate is combined with the sag control pre-mix to form a reactive composition. The shear force is continued to be applied to the reactive composition in the mixing device for a period that is sufficient to form the sag control composition having urea crystals with a D50 particle size distribution of from about 1 to about 5 microns.

In another embodiment, a method of forming a coating system is provided, with the coating system including at least one coating layer including urea crystals. The method includes providing a binder composition that includes a coating resin. The binder composition and a sag control composition are mixed to form a coating composition. The sag control composition includes urea crystals and a non-polymeric organic solvent. The urea crystals include the reaction product of a polyisocyanate and a mono-amine. The urea crystals are present in an amount of at least about 8 weight %, based on the total weight of the sag control composition. The coating composition includes from about 1 to about 5 weight % of the urea crystals based on the total weight of the coating resin in the coating composition. The coating composition is applied onto a substrate to form a coating layer having a dry thickness. A content of urea crystals having a size of greater than the dry thickness of the coating layer is less than about 3 weight %, based on the total weight of the sag control composition.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Sag control compositions, methods of forming sag control compositions, and methods of forming coating systems that include at least one coating layer including urea crystals of such sag control compositions are provided herein. The sag control compositions include urea crystals and a non-polymeric organic solvent, thereby enabling the sag control compositions to be employed in various coating compositions that contain different coating resins. The urea crystals, as referred to herein, include the reaction product of a polyisocyanate and a mono-amine and include a dimensional polyurea network in the form of particles that have a crystalline structure, as opposed to an amorphous structure. Further, the urea crystals are present in an amount of at least about 8 weight %, based on the total weight of the sag control compositions. The sag control compositions are non-Newtonian fluids that exhibit non-Newtonian properties with an inverse relationship between viscosity of the sag control composition and applied shear force, thereby enabling the sag control compositions to exhibit excellent stability even when the urea crystals are formed in the presence of non-polymeric organic solvent as an alternative to coating resins. Without being bound to any particular theory, it is believed that the crystalline form of the urea crystals and the relatively high loading of the urea crystals in the sag control composition results in the observed non-Newtonian properties and the resulting excellent stability of the sag control compositions described herein, even when the non-polymeric organic solvent is used as an alternative to coating resins. As such, the sag control compositions described herein are ideal for usage in various coating compositions that contain different coating resins and avoid poor stability associated with prior sag control compositions that employ organic solvent as an alternative to coating resins.

As noted to above, the sag control compositions described herein include urea crystals and a non-polymeric organic solvent. The urea crystals include the reaction product of a polyisocyanate and a mono-amine, with such reactants enabling the crystalline structure to be achieved. In embodiments, the polyisocyanate and mono-amine are chosen to produce substantially symmetrical molecules, and it is believed that symmetry of the resulting urea impacts an ability to achieve a crystalline structure. In embodiments, suitable polyisocyanates, i.e., isocyanate-containing compounds that contain more than one blocked or unblocked isocyanate group, are chosen from blocked or un-blocked aliphatic, cycloaliphatic, heterocyclic, aromatic di-, tri-, polyisocyanates or a combination thereof. Specific examples of suitable polyisocyanates include 1,6-hexamethylene diisocyanate, 2,2,4-trimethylhexane-1,6-diisocyanate, 2,4,4-trimethylhexane-1,6-diisocyanate, cyclohexyl-1,4-diisocyanate, isophorone diisocyanate, the adduct of 1 molecule of 1,4-butanediol and 2 molecules of isophorone diisocyanate, the adduct of 1 molecule of 1,4-butanediol and 2 molecules of hexamethylene diisocyanate, dicyclohexylmethane-4,4'-diisocyanate, xylene diisocyanate, 1,3,5-trimethyl-2,4-bis(isocyanatomethyl)benzene, toluene diisocyanate, diphenylmethane-4,4'-diisocyanate, adducts of hexamethylene diisocyanate, adducts of isophorone diisocyanate, and adducts of toluene diisocyanate. Isocyanurate-trimers of diisocyanates can also be suitable. In some embodiments, combinations of the polyisocyanates can also be suitable. In some embodiments, the polyisocyanate is 1,6-hexamethylene diisocyanate.

Suitable mono-amines include, for example, primary amines having in the range of from 1 to 20 carbon atoms. In some embodiments, secondary amines are used. However, the rate of reaction of the polyisocyanate with secondary amines is slower when compared to that of a primary amine and may impact resulting structure of the polyurea.

In embodiments, suitable mono-amines, i.e., amine-containing compounds that include a single amine group, are chosen from benzyl amine, ethylamine, 1-propylamine, n-propylamine, 1-butylamine, 2-butylamine, t-butylamine, n-pentylamine, 2-methyl-1-butylamine, 1-hexylamine, 2-hexylamine, 3-hexylamine, octylamine, decylamine, laurylamine, stearylamine, cyclohexylamine, and aniline. Other amines that are suitable include alkyl ether amines, such as, for example, 2-aminoethanol alkyl ether, 3-aminopropanol alkyl ether and 2-aminopropanol alkyl ether. Examples of secondary amines include, for example, the N-alkyl derivatives of any of the primary amines listed above wherein alkyl means an alkyl radical having in the range of from 1 to 10 carbon atoms. In some embodiments, combinations of any of the above listed amines are also suitable. In one embodiment, the amine is benzyl amine.

The urea crystals are present in the sag control composition an amount of at least about 8 weight %, such as from about 8 to about 15 weight %, or such as from about 10 to about 13 weight %, based on the total weight of the sag control composition. As set forth in further detail below, it was surprisingly found that a stable mixture can be achieved with higher loading of the urea crystals in the sag control composition that includes the non-polymeric organic solvent, whereas lesser amounts of the urea crystals result in less stability. The amounts of urea crystals in the sag control composition within the aforementioned ranges also enable the sag control compositions to be employed in various coating compositions that require different loadings of urea crystals without excessively diluting the coating compositions with the non-polymeric organic solvent.

The non-polymeric organic solvent, as referred to herein, is free of repeating units. In embodiments, the non-polymeric organic solvent consists of carbon and hydrogen. In embodiments, suitable non-polymeric organic solvents are polar and are capable of participating in hydrogen bonding. In embodiments, suitable solvents have a hydrogen bonding parameter, within the broader set of Hansen Solubility Parameters, of $1.7<X<7.7$, where X is the hydrogen bonding parameter of the solvent. The urea crystals have some solubility in the non-polymeric organic solvents, but have sufficiently low solubility to avoid dissolution of the urea crystals in the non-polymeric organic solvents. For example, in embodiments, the urea crystals have a solubility in the non-polymeric organic solvent of from about 0 to about up to 5 g/l at about 21° C.

In embodiments, the non-polymeric organic solvent is chosen from alcohols, esters, aromatic hydrocarbons, or combinations thereof. Examples of suitable alcohols include linear or branched alcohols having from 1 to 12 carbon atoms such as, but not limited to, butanol. Examples of suitable esters include alkyl acetates having from 2 to 10 carbon atoms in the alkyl group such as, but not limited to, butyl acetate, ethyl acetate, n-butyl acetate, tert-butyl acetate, isobutyl acetate, methoxy propyl acetate. Examples of suitable aromatic hydrocarbons include, but are not limited to, toluene, xylene, or combinations thereof. In addition to or as an alternative to the alcohols, esters, and aromatic hydrocarbons, other non-polymeric organic solvents that may be employed include, but are not limited to, ketones such as, but not limited to, acetone, methyl ethyl ketone, methyl isobutyl ketone, methyl amyl ketone and diisobutyl ketone; ethers such as, but not limited to, ethylene glycol dimethyl ether, ethylene glycol dibutyl ether; and a combination thereof.

In embodiments, the non-polymeric organic solvent is present in an amount of from about 85 to about 92 weight %, such as from about 87 to about 90 weight %, based on the total weight of the sag control composition. In embodiments, the sag control composition includes primarily the urea crystals and the non-polymeric organic solvent, although it is to be appreciated that minimal amounts of other components typically included in sag control compositions may also be included in the sag control composition. In embodiments, the sag control composition is free of hydroxyl-functional resin, and may be free of any coating resin. As referred to here, "coating resin" is a reactive component of a coating system that cures, either with itself or with a hardener, to form a polymeric network in a resulting coating. In this regard, the sag control composition described herein may be distinguished from conventional sag control compositions that are formed using coating resins. As also referred to herein, "free of" means that the sag control composition is either completely devoid of the referenced component or that the referenced component is present in such low amounts (e.g., less than about 1 weight %) that the referenced component has no material impact on the properties of the sag control composition or subsequent usage thereof. In other embodiments, small amounts of the hydroxyl-functional resin may be present in the sag control composition provided that the hydroxyl-functional resin does not impact properties of a coating composition or resulting coating layer that contains a different coating resin that is incompatible with the hydroxyl-functional resin. For example, in embodiments, the hydroxyl functional resin or coating resin is present in the sag control composition in an amount of less than about 20 weight %, such as less than 5 weight %, or such as from about 0.1 to about 5 weight %, based on the total weight of the sag control composition.

In embodiments, the sag control composition has a D50 particle size distribution of from about 1 to about 5 microns. The "particles" in the sag control composition are primarily the urea crystals, although it is to be appreciated that in embodiments other minor amounts of other particles may also be present. The particle size distribution within the sag control composition may contribute to stability of the sag control composition, with stable mixtures possible when the D50 particle size distribution is within the aforementioned range. Additionally, the sag control composition may have a minimal content of large particles to minimize surface defects in coating layers formed from coating compositions that include the sag control composition. For example, in embodiments, a content of particles having a size of greater than about 15 microns is less than about 3 weight %, based on the total weight of the sag control composition. As described in further detail below, D50 particle size distribution and content of large particles may be controlled by a manner in which the sag control composition is formed, although it is to be appreciated that D50 particle size distribution and content of large particles may be adjusted after formation of the sag control composition.

As noted above, a stable mixture is possible with the sag control composition described herein. In particular, in embodiments, the sag control agent is a stable mixture with a single phase at a temperature of about 21° C., based upon visual observation for a period of at least 10 minutes, such as at least 24 hours, after forming the mixture.

Methods of forming the sag control composition are not particularly limited, and conventional techniques may be employed to form the sag control composition. However, as noted above, in embodiments, D50 particle size distribution and content of large particles may be controlled by a manner in which the sag control composition is formed, thereby avoiding post-formation techniques such as grinding that may otherwise be required to sufficiently decrease the D50 particle size distribution of the sag control composition. Further, grinding may pose additional problems. For example, sag control compositions as described herein may have too high of a viscosity, given the loading of the urea crystals, to enable pumping through standard pipes and hoses that are employed in conventional grinding mills. Further, the standard grinding mills may degrade the urea crystals by grinding them to a size that is too small to maintain desired rheology. However, a mixing device chosen from an emulsifier device or a disperser may be employed to form the sag control compositions, thereby avoiding the potential drawbacks associated with grinding and described above while still achieving the D50 particle size distribution and content of large particles in the sag control composition within the ranges described above.

In an embodiment, to form the sag control composition, the mono-amine and the non-polymeric organic solvent are combined to form a sag control pre-mix. A shear force is applied to the sag control pre-mix in an emulsifier device. The mono-amine and the non-polymeric organic solvent may be combined in the emulsifier device or may be first combined and then loaded into the emulsifier device. Suitable emulsifier devices include, for example, rotor/stator machines commercially available from Silverson Machines, Inc. and Cavatron GmbH.

While applying the shear force to the sag control pre-mix in the emulsifier device, the polyisocyanate is combined with the sag control pre-mix to form a reactive composition. The mono-amine and the polyisocyanate are combined in an amount sufficient to form a stable mixture with a single phase based upon visual observation for a period of at least 10 minutes after completion of shear force application for the period of time described below. For example, in embodiments, the mono-amine and the polyisocyanate are combined in amounts sufficient to form the urea crystals in an amount of at least 8 weight %, based on the total weight of the resulting sag control composition. The shear force is continually applied to the reactive composition in the emulsifier device for a period sufficient to form the sag control composition having the urea crystals with the D50 particle size distribution of from about 1 to about 5 microns. For example, in embodiments, the shear force may be applied to the reactive composition for a period of at least 10 seconds to form the sag control composition. The sag control composition prepared in accordance with the above-described method, being a stable mixture for at least the above-referenced period of time, may be effectively stored until desired usage in a coating composition. For example, in embodiments, the sag control composition is stored for a period of at least 60 days prior to mixing a binder composition and the sag control composition while remaining a stable composition.

In another embodiment, a disperser is employed as an alternative to the emulsifier device. For example, the disperser may employ a high shear Cowles impeller to apply the shear force through the various stages of preparation of the sag control composition.

An exemplary method of forming a coating system using the sag control compositions described herein will now be addressed. The coating system includes at least one coating layer that includes urea crystals provided by the sag control compositions, although it is to be appreciated that the non-polymeric organic solvent of the sag control compositions will substantially or completely flash off from the coating layer in the resulting coating system.

In an embodiment, a binder composition that includes a coating resin is provided. The binder composition may be a conventional binder composition, and suitable coating resins that may be included in the binder composition include, but are not limited to, acrylic, polyester, polyether, polyurethane polymers or combinations thereof. The polymers may contain one or more functional groups that can crosslink with a crosslinking agent to form a crosslinked network that can provide excellent durability, adhesion and appearance to a coating layer formed from the coating composition after curing. The crosslinking agents can include, for example, blocked or unblocked polyisocyanates; melamines or other amino resins; or other conventional crosslinking agents. The binder composition includes at least the coating resin, and may further include other components of conventional coating compositions (e.g., pigments), including the crosslinking agent depending upon the type of crosslinking agent as described in further detail below.

The binder composition and the sag control composition are mixed to form a coating composition. For example, the sag control composition may be added directly to the binder composition, and the sag control composition may be added to provide from about 1 to about 5 weight % of the urea crystals based on the total weight of the coating resin in the composition.

Depending upon the type of crosslinking agent, the coating composition can be formulated as a one-pack (1K) or two-pack (2K) coating composition. For example, if polyisocyanates with free isocyanate groups are used as the crosslinking agent, the coating composition can be formulated as a two-pack coating composition wherein the crosslinking agent is mixed with other components of the coating composition, including the binder composition and the sag control composition, only shortly before application of the coating composition. Thus, in the 2K coating compositions, the crosslinking agent may be absent from the binder composition when the binder composition and the sag control composition are mixed. If blocked polyisocyanates are used as the crosslinking agent, the coating composition can be formulated as a one-pack (1K) coating composition with the blocked polyisocyanates and coating resin packaged together. Further, the binder composition may include the blocked polyisocyanate when mixed with the sag control composition. The coating composition can be further adjusted to spray viscosity with organic solvents (which may be the same as or different from the non-polymeric organic solvent of the sag control composition) before being applied onto a substrate.

The coating composition may be suitable for vehicle and industrial coating and can be applied using known processes. In the context of vehicle coating, the coating composition can be used both for vehicle original equipment manufacturing (OEM) coating and for repairing or refinishing coatings of vehicles and vehicle parts. Curing of the coating composition can be accomplished at ambient temperatures, such as temperatures in a range of from 18° C. to 35° C., or at elevated temperatures, such as at temperatures in a range of from 35° C. to 150° C. Typical curing temperatures of 20° C. to 80° C., in particular of 20° C. to 60° C., can be used for vehicle repair or refinish coatings.

The coating composition including the sag control composition can be applied by conventional techniques such as, for example, spraying, electrostatic spraying, dipping, brushing, and flow coating. In some embodiments, the coating composition is applied to a substrate to form a coating layer having a dry thickness. In particular, as applied, the coating composition has a wet coating thickness, also known as wet film thickness (wft), and has a dry thickness after drying and curing. In embodiments, the coating composition has a wet thickness in a range of from about 0.6 to about 36 mils (about 15 to about 914 micrometers), such as from about 2 to about 36 mils (about 50 to about 914 micrometers), or such as from about 5 to about 36 mils (about 127 to about 914 micrometers). After drying and curing, the dry coating thickness can be in the range of from about 0.3 to about 20 mils (about 7.6 to about 510 micrometers), such as from about 1 to about 20 mils (about 25 to about 510 micrometers), or such as from about 2.5 to about 20 mils (about 63 to 510 micrometers). In embodiments, a content of urea crystals that have a size of greater than the dry thickness of the coating layer is less than about 3 weight %, based on the total weight of the sag control composition. Urea crystals that have the size greater than the dry thickness of the coating composition may cause surface defects in the resulting coating layer, and sag control compositions that have the above-referenced content of urea crystals that have the size greater than the dry thickness exhibit minimized surface defects in the resulting coating layer. Sag control compositions that have the above-referenced content of urea crystals can be formed, for example, using the mixing devices as described above.

EXAMPLES

Samples of sag control compositions were prepared using the components set forth in TABLE I below, wherein all values are presented in weight % based on the total weight of the resulting sag control composition.

TABLE I

|  | Ex. 1 | Ex. 2 | Ex. 3 | Ex. 4 | Comp. Ex. 1 | Comp. Ex 2. |
| --- | --- | --- | --- | --- | --- | --- |
| Amine A | 7.41 | 7.41 | 7.41 | 7.41 | 1.71 | 1.71 |
| Polyisocyanate A | 5.59 | 5.59 | 5.59 | 5.59 | 1.29 | 1.29 |
| Solvent A | 87.00 | — | 83.00 | — | — | — |

TABLE I-continued

|  | Ex. 1 | Ex. 2 | Ex. 3 | Ex. 4 | Comp. Ex. 1 | Comp. Ex. 2. |
|---|---|---|---|---|---|---|
| Solvent B | — | 87.00 | — | — | — | — |
| Solvent C | — | — | 4.00 | 87.00 | — | 97.00 |
| Coating Resin | — | — | — | — | 97.00 | — |
| Total | 100.00 | 100.00 | 100.00 | 100.00 | 100.00 | 100.00 |

Amine A is benzyl amine.
Polyisocyanate A is 1,6-hexamethylene diisocyanate.
Solvent A is butyl acetate (hydrogen bonding parameter of 3.1).
Solvent B is an aromatics fluid having a hydrogen bonding parameter of 1.4 and commercially available under the tradename Solvesso ® from Exxon Mobile Corporation of Houston, TX.
Solvent C is butanol (hydrogen bonding parameter of 7.7).
Coating Resin is an acrylic polymer resin.

The sag control compositions were prepared by combining the amine and solvents (or, alternatively, the coating resin for purposes of Comparative Example 1) to form a sag control pre-mix. A shear force was applied to the sag control pre-mix in a disperser using a high shear Cowles impeller at about 2000 rpm. While applying the shear force to the sag control pre-mix in the disperser, a slug of the polyisocyanate was combined with the sag control pre-mix to form a reactive composition. The shear force was applied to the reactive composition for a period of about 6 minutes to form the sag control compositions. For Examples 1-4, the resulting amount of urea crystals formed in the sag control compositions was about 13 weight %, based on the total weight of the sag control compositions. For Comparative Example 1, the resulting amount of polyurea formed in the sag control composition was about 3% weight %, based on the total weight of the sag control composition. For Comparative Example 2, the resulting amount of urea crystals formed in the sag control composition was about 3 weight %, based on the total weight of the sag control composition.

Figure 1:
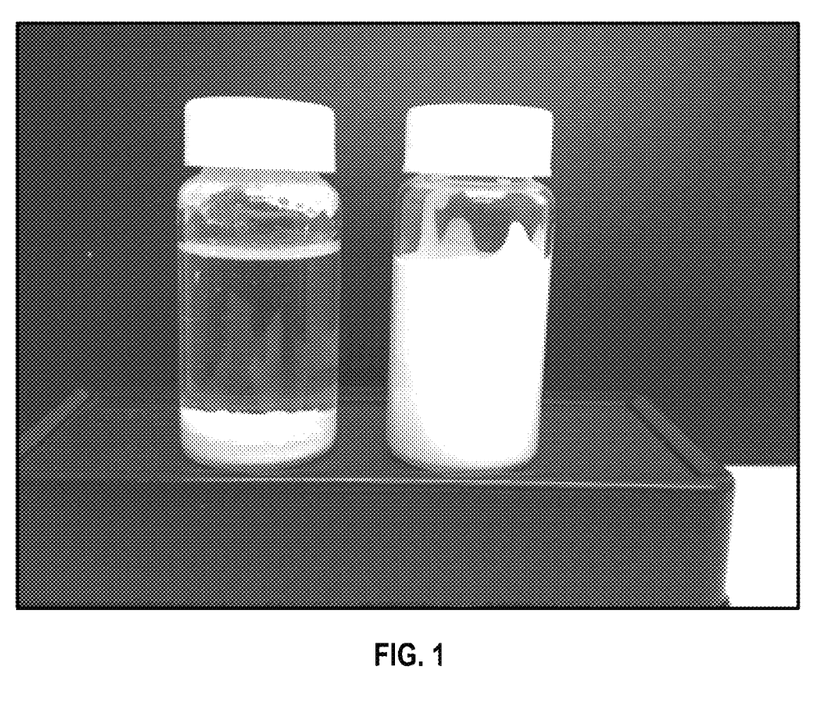
FIG. 1 is a photograph showing a separated sag control composition with 3 weight % of urea crystals based on the total weight of the sag control composition, and a single-phase sag control composition with 13 weight % of urea crystals based on the total weight of the sag control composition in accordance with an exemplary embodiment.

FIG. 1 illustrates relative stability of the sag control composition of Example 4 in the vial on the right side of the photograph as compared to relative stability of the sag control composition of Comparative Example 2 after storage at 20 degrees C. for a period of 24 hours As can be seen in FIG. 1, the sag control composition of Example 4 remained a stable mixture with a single phase based upon visual observation, whereas the sag control composition of Comparative Example 2 exhibited poor stability with the urea crystals separated out of solution and accumulating at the bottom of the vial.

Figure 2:
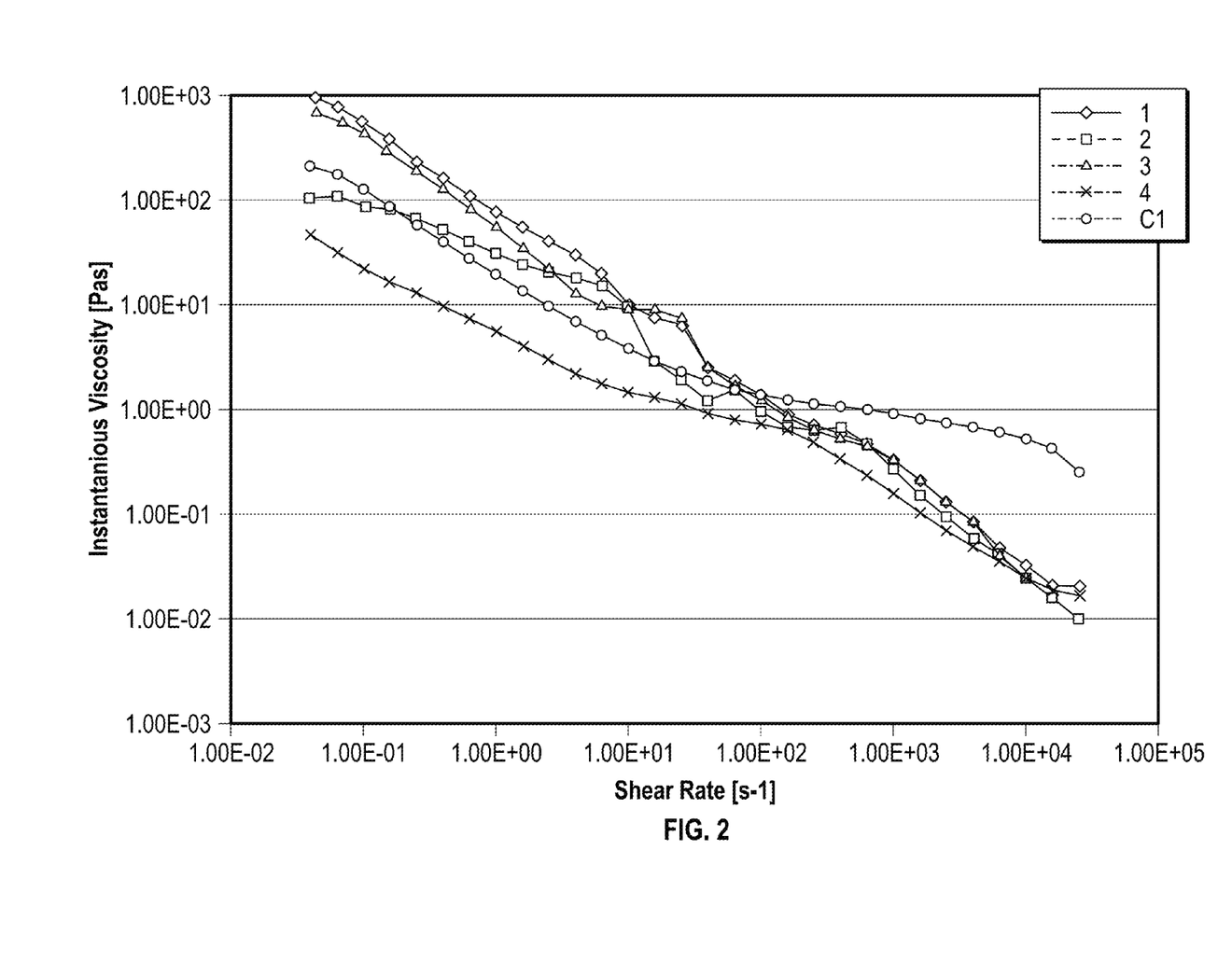
FIG. 2 is a graph showing viscosity versus shear rate for various sag control compositions that employ different solvents.

Viscosity versus shear rate data was generated for Examples 1-4 and Comparative Example 2, and the results are shown in the graph of FIG. 2. In particular, instantaneous viscosity was measured for Examples 1-4 (designated as 1, 2, 3, and 4 in FIG. 2) and Comparative Example 2 (designated as C1 in FIG. 2) at different shear rates using the disperser and the high shear Cowles blade. As can be seen from FIG. 2, an inverse relationship between viscosity of the sag control compositions of Examples 1-4 and Comparative Example 1 exists, with lower sheer rates resulting in higher instantaneous viscosity and with higher sheer rates resulting in lower instantaneous viscosity.

Additional samples of sag control compositions were prepared in the same manner as described above using the components set forth in TABLE II below, wherein all values are presented in weight % based on the total weight of the resulting sag control composition.

TABLE II

|  | Ex. 5 | Ex. 6 | Ex. 7 | Comp. Ex. 3 |
|---|---|---|---|---|
| Amine A | 4.56 | 4.56 | 4.56 | 1.71 |
| Polyisocyanate A | 3.44 | 3.44 | 3.44 | 1.29 |
| Solvent A | — | — | 92.00 | — |
| Solvent B | — | 92.00 | — | — |
| Solvent C | 92.00 | — | — | — |
| Coating Resin | — | — | — | — |
| Total | 100.00 | 100.00 | 100.00 | 100.00 |

Dispersions including the sag control compositions of TABLE II were then prepared using the sag control compositions of Examples 5-7 and Comparative Example 3 and further components as set forth in TABLE III below, wherein all values are presented in weight % based on the total weight of the resulting dispersion.

TABLE III

|  | Disp. 1 | Disp. 2 | Disp. 3 | Comp. Disp. 1 | Comp. Disp. 2 | Comp. Disp. 3 |
|---|---|---|---|---|---|---|
| Ex. 5 | 27.88 | — | — | — | — | — |
| Ex. 6 | — | 27.88 | — | — | — | — |
| Ex. 7 | — | — | 27.88 | — | — | — |
| Comp. Ex. 3 | — | — | — | 74.35 | 74.35 | 74.35 |
| Coating Resin | 72.12 | 72.12 | 72.12 | — | — | — |
| Solvent A | — | — | — | — | — | 25.65 |
| Solvent B | — | — | — | — | 25.65 | — |
| Solvent C | — | — | — | 25.65 | — | — |
| Total | 100.00 | 100.00 | 100.00 | 100.00 | 100.00 | 100.00 |

To prepare the dispersions of TABLE III, the components were combined and shear force was applied to the mixture in a disperser using a high shear Cowles impeller at about 2000 rpm for a period of about 6 minutes to form the dispersions.

Figure 3:
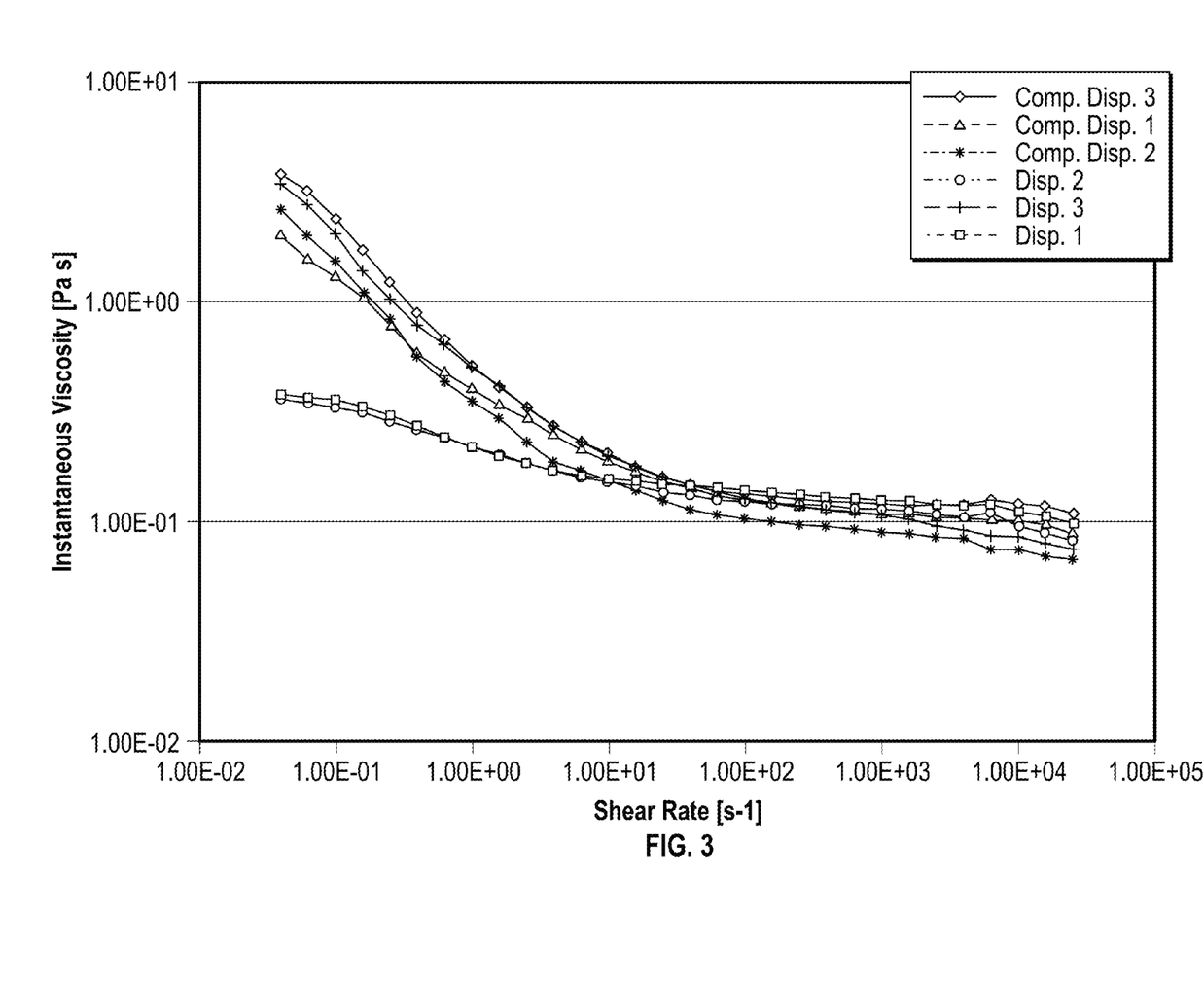
FIG. 3 is a graph showing viscosity versus shear rate for various dispersions prepared from different sag control compositions.

Viscosity versus shear rate data was generated for the dispersions shown in TABLE III, and the results are shown in the graph of FIG. 3. In particular, instantaneous viscosity was measured for Dispersions 1, 2, and 3 (designated as Disp. 1, Disp. 2, and Disp. 3 in FIG. 2) and Comparative Dispersions 1, 2, and 3 (designated as Comp. Disp. 1, Comp. Disp. 2, and Comp. Disp. 3 in FIG. 2) at different shear rates using the disperser and the high shear Cowles blade. As can be seen from FIG. 3, an inverse relationship between viscosity of the Dispersions 1, 2, and 3 and Comparative Dispersions 1, 2, and 3 exists, with lower sheer rates resulting in higher instantaneous viscosity and with higher sheer rates resulting in lower instantaneous viscosity.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A sag control composition comprising:
   urea crystals comprising the reaction product of a polyisocyanate and a mono-amine; and
   a non-polymeric organic solvent present in an amont of from about 85 to about 95 weight % based on the total weight of the sag control composition;
   wherein the sag control composition comprises the urea crystals in an amount of at least about 8 weight %, based on the total weight of the sag control composition and is a stable mixture with a single phase at a temperature of about 21° C. based upon visual observation for a period of at least 10 minutes after forming the mixture.

2. The sag control composition of claim 1, wherein the urea crystals are present in an amount of from about 8 to about 15 weight %, based on the total weight of the sag control composition.

3. The sag control composition of claim 1, wherein the polyisocyanate is chosen from blocked or un-blocked aliphatic, cycloaliphatic, heterocyclic, aromatic di-, tri-, polyisocyanates or a combination thereof.

4. The sag control composition of claim 1, wherein the mono-amine is chosen from primary amines having in the range of from 1 to 20 carbon atoms.

5. The sag control composition of claim 1, free of hydroxyl-functional resin.

6. The sag control composition of claim 5, free of a coating resin.

7. The sag control composition of claim 1, having a D50 particle size distribution of from about 1 to about 5 microns.

8. The sag control composition of claim 7, wherein a content of particles having a size of greater than about 15 microns is less than about 3 weight %, based on the total weight of the sag control composition.

9. The sag control composition of claim 1, wherein the non-polymeric organic solvent is polar and is capable of participating in hydrogen bonding.

10. The sag control composition of claim 9, wherein the urea crystals have a solubility in the non-polymeric organic solvent of from about 0 to about 5 g/l at about 21° C.

11. The sag control composition of claim 9, wherein the non-polymeric organic solvent has a hydrogen bonding parameter of $1.7 \leq X \leq 7.7$, where X is the hydrogen bonding parameter of the solvent.

12. The sag control composition of claim 1, wherein the sag control composition is a non-Newtonian fluid with an inverse relationship between viscosity of the sag control composition and applied shear force.

13. A method of forming a sag control composition, wherein the method comprises the steps of:
   combining a mono-amine and a non-polymeric organic solvent to form a sag control pre-mix;
   applying shear force to the sag control pre-mix in a mixing device chosen from an emulsifier device or a disperser;
   while applying the shear force to the sag control pre-mix in the mixing device, combining a polyisocyanate with the sag control pre-mix to form a reactive composition;
   continuing to apply the shear force to the reactive composition in the mixing device for a period sufficient to form the sag control composition having urea crystals with a D50 particle size distribution of from about 1 to about 5 microns;
   wherein the sag control composition comprises the urea crystals in an amount of at least about 8 weight %, based on the total weight of the sag control composition, wherein the non-polymeric organic solvent is present in an amount of from about 85 to 92 weight % based on the total weight of sag control composition, based on the total weight of the sag control compositiin, and wherein the sag control composition is a stable mixture with a single phase at a temperature of about 21° C. based upon visual observation for a period of at least 10 minutes after forming the mixture.

14. A method of forming a coating system comprising at least one coating layer including urea crystals, wherein the method comprises the steps of:
   providing a binder composition comprising a coating resin;
   mixing the binder composition and a sag control composition to form a coating composition, wherein the sag control composition comprises:
      urea crystals comprising the reaction product of a polyisocyanate and a mono-amine, wherein the urea crystals are present in an amount of at least about 8 weight %, based on the total weight of the sag control composition; and
      a non-polymeric organic solvent present in an amount of from about 85 to 92 weight % based on the total weight of the sag control composition; and
      wherein the coating composition comprises from about 1 to about 5 weight % of the urea crystals based on the total weight of the coating resin in the coating composition; and
   wherein the sag control composition is a stable mixture with a single phase at a temperature of about 21° C. based upon visual observation for a period of at least 10 minutes after forming the mixture;
   applying the coating composition onto a substrate to form a coating layer having a dry thickness;
   wherein a content of urea crystals having a size of greater than the dry thickness of the coating layer is less than about 3 weight %, based on the total weight of the sag control composition.

15. The method of claim 14, wherein mixing the binder composition and the sag control composition comprises mixing binder composition and the sag control composition free of the coating resin.

16. The method of claim 14, further comprising storing the sag control composition for a period of at least 60 days prior to mixing the binder composition and the sag control composition.

17. The sag control composition of claim 1, wherein the sag control composition is a stable mixture with a single phase at a temperature of about 21° C. based upon visual observation for a period of at least 24 hours after forming the mixture.

18. The sag control composition of claim 17, wherein the sag control composition is free of hydroxyl-functional resin.

19. A sag control composition comprising:
   urea crystals comprising the reaction product of a polyisocyanate and a mono-amine; and
   a non-polymeric organic solvent;

wherein the sag control composition comprises the urea crystals in an amount of at least about 8 weight %, based on the total weight of the sag control composition and is a stable mixture with a single phase at a temperature of about 21° C. based upon visual observation for a period of at least 10 minutes after forming the mixture; and wherein the sag control composition is free of hydroxyl-functional resin.

* * * * *